United States Patent [19]

Bounds

[11] Patent Number: 5,657,700
[45] Date of Patent: *Aug. 19, 1997

[54] RAILROAD HOPPER CAR WITH BALLAST DISTRIBUTING BLADES AND REMOTE CONTROL SYSTEM

[75] Inventor: Ivan Eugene Bounds, San Diego, Calif.

[73] Assignee: Herzog Contracting Corporation, St. Joseph, Mo.

[*] Notice: The term of this patent shall not extend beyond the expiration date of Pat. No. 5,423,268.

[21] Appl. No.: 572,312

[22] Filed: Dec. 14, 1995

[51] Int. Cl.⁶ .................................................. B61D 7/30
[52] U.S. Cl. .................. 105/311.1; 105/240; 105/241.2; 105/283; 104/2; 222/504; 37/104; 37/105
[58] Field of Search .................. 105/240, 241.2, 105/280, 283, 286, 311.1; 104/2, 12; 222/504; 298/24, 31, 35 M; 37/104, 105, 106, 107; 171/16

[56] References Cited

U.S. PATENT DOCUMENTS

| | | | |
|---|---|---|---|
| 2,989,930 | 6/1961 | Flowers | 105/248 |
| 3,191,944 | 6/1965 | Watts | 222/504 |
| 3,295,704 | 1/1967 | Gillick et al. | 105/311.1 |
| 3,371,826 | 3/1968 | Speno | 105/240 |
| 3,446,373 | 5/1969 | Keister, Jr. et al. | 105/240 |
| 3,596,565 | 8/1971 | Atkinson | 105/240 |
| 3,654,872 | 4/1972 | Fearon | 105/239 |
| 3,682,232 | 8/1972 | Fearon | 414/400 |
| 3,701,320 | 10/1972 | Fearon et al. | 104/6 |
| 3,717,110 | 2/1973 | Miller | 105/284 |
| 3,822,650 | 7/1974 | Fearon | 105/239 |
| 3,838,649 | 10/1974 | Barnard | 105/240 |
| 3,877,160 | 4/1975 | Plasser et al. | 37/104 |
| 3,877,384 | 4/1975 | Fearon et al. | 105/239 |
| 4,009,664 | 3/1977 | Fearon | 105/280 |
| 4,249,325 | 2/1981 | Theurer | 104/2 |
| 4,282,663 | 8/1981 | Theurer | 37/104 |
| 4,325,308 | 4/1982 | Erfurth | 105/28 |
| 4,359,176 | 11/1982 | Johnson | 105/240 |
| 4,601,244 | 7/1986 | Fischer | 105/240 |
| 4,766,820 | 8/1988 | Ritter et al. | 105/240 |
| 5,038,966 | 8/1991 | Olk | 105/282.1 |
| 5,094,018 | 3/1992 | Theurer et al. | 104/2 |
| 5,115,748 | 5/1992 | Westlake | 105/286 |
| 5,144,895 | 9/1992 | Murray | 105/286 |
| 5,284,097 | 2/1994 | Peppin et al. | 105/311.1 |
| 5,311,822 | 5/1994 | Bounds | 105/311.1 |
| 5,423,268 | 6/1995 | Bounds | 105/311.1 |

FOREIGN PATENT DOCUMENTS

| | | | |
|---|---|---|---|
| 930612 | 7/1973 | Canada. | |
| 480756 | 9/1924 | Germany | 37/105 |
| 724378 | 10/1980 | U.S.S.R. | 105/311.1 |

*Primary Examiner*—S. Joseph Morano
*Attorney, Agent, or Firm*—Litman, McMahon and Brown, L.L.C.

[57] ABSTRACT

A ballast distributing railroad car has a number of ballast hoppers, each with a selectively operable hopper discharge control member which is operable to selectively drop material from the respective hopper either inside of or outside of the rails of a railroad track. The railroad car also has a pair of ballast distributing blades pivotally attached beneath it, either between the hopper discharge control members or one at either end of the car, with the blades being mirror images of each other. Each blade and each hopper discharge control member can be selectively operated via an independent hydraulic actuator. A remote control radio transmitter and car mounted receiver provide for remote, individual and selective control of hopper discharge control members and blades on a car.

26 Claims, 11 Drawing Sheets

RAILROAD HOPPER CAR WITH BALLAST DISTRIBUTING BLADES AND REMOTE CONTROL SYSTEM

BACKGROUND OF THE INVENTION

The invention relates to a ballast hopper door and blade control apparatus and method for controlling a plurality of hopper discharge doors and a pair of ballast distributing blades on a railroad ballast car.

Railroad ballast has traditionally been discharged and/or spread by specially designed hopper cars called "ballast cars". In such cars, the ballast is discharged through hopper doors positioned beneath the hopper. In the past, when such doors were positioned directly beneath the car, ballast discharged therefrom was spread by hand, a labor intensive task, or by an additional specially equipped railroad car which followed the ballast hopper car.

These problems were addressed in U.S. Pat. No. 3,654,872 ('872 patent) in which a ballast car has four hoppers, each of which is provided with a bottom-mounted discharge opening with a discharge control member inserted therein. The discharge openings are centered over a rail and each discharge control member is a pivotable structure with a pair of side walls extending at an angle outward from an arcuate top surface. A bottom wall connects the side walls and a pair of end walls extend past the side walls to form channels on either side of the discharge control member. The discharge control member is attached at a pivot point positioned below the discharge opening. The arcuate top surface covers the discharge opening when the discharge control member is pivoted to a center position. When the discharge control member is pivoted to one side or the other, the discharge opening is partially opened and ballast is released through the channel formed by one of the angled side walls and the end walls and is thus directed to an associated side of the railroad rail. By selectively pivoting the discharge control member, a proper mount of ballast is directed to a desired position which minimizes or eliminates subsequent spreading requirements. On ballast cars containing pairs of side-by-side hoppers, ballast can be selectively distributed inside or outside of each rail to further minimize spreading requirements.

Even with the use of discharge control members for directing ballast to one side or the other of respective rails, nevertheless, after the ballast is dropped, some spreading and redistributing is required.

In U.S. Pat. No. 5,423,268, ("the '268 patent") issued to the present inventor on Jun. 13, 1995, which patent is hereby incorporated by reference, a ballast distributing railcar is illustrated with a pair of ballast distributing blades arrayed, one proximate the wheels on each respective end of the railcar. A pair of ballast carrying hoppers each include a pair of center discharge hopper doors covering respective discharge openings from the hoppers. The blades are associated with hydraulic systems which can selectively raise and lower them such that one of the blades is correctly oriented for distributing ballast regardless of the direction of travel of the railcar. The center discharge doors of the '268 patent, however, allow the dropping of ballast only between the rails. Thus, the ballast distributing blades must move ballast from between the rails to the outside of the rails in a somewhat inefficient operation. Furthermore, the placement of the ballast distributing blades near the wheels, although generally satisfactory, has the effect of distancing the operative blade from one of the sets of hopper discharge doors. This blade placement also prevents the simultaneous use of one hopper or hopper pair in a car for large scale depositing of ballast while the other hopper or hopper pair is used for "sprinkle dumping" of relatively small amounts of ballast to fill in holes and irregularities in the ballast bed. Finally, in the '268 patent, power to the hydraulic systems for operating hopper doors and blades was provided from an electrical generator or storage battery. In some cases, it would be preferable to use existing sources of compressed air, such as air compressors integrally provided on locomotives, to drive the hydraulic systems. Solar electrical cells are another alternative energy source.

It is clear that a need exists for an improved ballast distributing railcar with ballast distributing blades and a remote control apparatus and method therefor. The apparatus and method should provide alternative blade and hopper placement strategies as well as alternative power sources for operating the blades, hopper doors, hopper chutes and remote control systems. Simultaneous large scale ballast drops and sprinkle dumping should also be possible in at least some railcar embodiments.

SUMMARY OF THE INVENTION

The present invention is directed to a ballast distributing railcar with multiple ballast carrying hoppers. Each hopper is provided with a bottom discharge opening in which is positioned a respective discharge control member which is selectively operable to drop ballast either inside of or outside of a respective rail over which the opening is centered. The railcar also includes a pair of ballast distributing blades suspended beneath the car which blades are associated with hydraulic operators for selectively raising and lowering the blades. A remote control system is provided for selectively remotely controlling the hopper doors and the blade operators with the remote control system including a remote transmitter and a receiver located on the railcar. Encoded selective signals are sent from transmitter to receiver to selectively raise and lower the blades and open and close or change the orientation of the hoppers.

In a first embodiment, a pair of ballast distributing blades are positioned on a railcar which also incorporates two pairs of hoppers with each hopper incorporating a respective opening with a hopper discharge control member positioned therein. The pair of ballast distributing blades with each blade arrayed outside of a respective one of the hopper discharge control members and proximate the wheels near one end of the railcar. Each hopper discharge control member is controllable to distribute ballast either inside or outside of a respective rail over which the hopper discharge control member is positioned. The hopper discharge control members and the end mounted distributing blades are all selectively remotely controllable.

In a second embodiment, a pair of ballast distributing blades are positioned on a railcar incorporating two pairs of hoppers with each hopper incorporating a respective opening with a hopper discharge control member positioned therein. The pair of ballast distributing blades are arrayed with each blade being positioned inside of a respective one of the hopper discharge control members and proximate the center of the railcar. Again, each hopper discharge control member is controllable to distribute ballast either inside or outside of a respective rail over which the hopper discharge control member is positioned. The hopper discharge control members and the center mounted distributing blades are all selectively remotely controllable.

In a third embodiment, a pair of ballast distributing blades are positioned near wheels on respective ends of a railcar incorporating a single pair of hoppers with each hopper incorporating a respective one of a pair of elongate discharge openings with a respective elongate hopper discharge control member positioned in each opening. Each elongate hopper discharge control member is selectively controllable to distribute ballast either inside or outside of a respective rail over which the hopper discharge control member is arrayed. The hopper discharge control members and the end mounted distributing blades are all selectively remotely controllable.

Power for the hydraulic systems and the remote control systems are derived from a number of different sources. In a first power system, an integral locomotive mounted air compressor is used to drive an railcar mounted air motor which, in turn drives a hydraulic pump for operating all of the hydraulic motors and piston and cylinder units on each railcar. In an alterative power system, a photovoltaic solar collector is arrayed on the railcar and is used to charge a large electrical storage battery which, in turn, drives a hydraulic pump for operating all of the hydraulic motors and piston and cylinder units on the railcar. Power can also be provided conventionally via a conventional generator mounted on each railcar to drive a hydraulic pump on that railcar, or a single large generator or bank of generators can be mounted on a dedicated railcar to drive all hydraulic systems on a plurality of ballast distributing railcars, as taught by the '268 patent.

OBJECTS AND ADVANTAGES OF THE INVENTION

The principal objects of the present invention are: to provide an improved railroad hopper car; to provide such a railroad hopper car with ballast distributing blades and selective hopper discharge control members; to provide such a railroad hopper car with a remote control system for the blades and hopper discharge control members; to provide a variety of alterative blade and hopper discharge arrangements and orientations for such a railroad hopper car; to provide such a railroad hopper car in which both a plurality of hopper discharge control members and the distributing blades are controlled by hydraulic actuators; to provide such a railroad hopper car in which valves for the hydraulic actuators are controlled by solenoids selectively operated by a car-mounted radio receiver; to provide a variety of alternative methods of powering the hydraulic system in such a railroad hopper car; and, to provide such a railroad hopper car design and hydraulic system which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limited, but merely as a basis for the claims and as a representative basis for teaching one skilled in the art to variously employ the present invention in virtually any appropriately detailed structure.

FIRST BALLAST CAR EMBODIMENT WITH PIVOTING DISCHARGE MEMBER

Referring to FIGS. 1–5, a hopper door control apparatus, generally referenced as 1, is shown in conjunction with a railroad ballast hopper car 2 operating on a pair of railroad rails 3. The car 2 is shown with a load of railroad ballast 4, which usually comprises fine gravel, cinders or the like, for distribution between and on either side of the railroad rails 3.

Typically, the ballast car 2 will include up to 4 separate hoppers 5, each of which has a bottom discharge opening 11. At the bottom of each hopper discharge opening 11 is positioned a ballast discharge control assembly 12. For convenience, only one such opening I 1 is illustrated in FIGS. 1, 2, 3 and 5, since each such opening 11 and discharge control assembly 12 is identical.

The discharge control assembly 12 comprises an open top frame member 13 which is placed adjacent to and surrounding the hopper discharge opening 11. A pair of opposed triangular shaped end support plates 14 and 15 are attached at either end of the open frame member 13. A pivoting discharge control member 21 comprises an arcuate top surface 22 with a radius approximately equal to the distance from a pivot point 23 on the end support plates 14 and 15, to the lower end of the discharge opening 11. The arcuate top surface 22 covers the entire discharge opening 11 when the discharge control member 21 is pivoted to a center position to prevent discharge of any of the ballast material 4. A pair of side walls 24 and 25 extend outward from the arcuate top surface 22, with the side walls connected together by a bottom wall 31 and a pair of end walls 32 and 33. The end walls 32 and 33 extend past the side walls 24 and 25 to channel discharged ballast along each of the side walls 24 and 25, thus forming gravity chutes. Each end wall 32 and 33 of the discharge control member 21 is rigidly attached to a pivoting drive shaft 34 (FIG. 5), which extends through openings in both end support plates 14 and 15 and which is attached thereto by a pair of support plates 36 and 37, respectively. A transmission gear assembly 35 is connected to the drive shaft 34 and to a reversible electric motor 41. The motor 41 is operative to turn the drive shaft 34 via a reduction gear assembly (not shown) in the transmission 35. The transmission 35 is bolted onto a horizontal support plate 42 via a plurality of bolt and nut assemblies 43. The horizontal support plate 42 is attached to a vertical support plate 44 which is supported by a rod 45 attached at one end to the top of the support plate 44 and pivotally attached at the other end to a frame member 51 on the railroad car 2.

Figure 4:
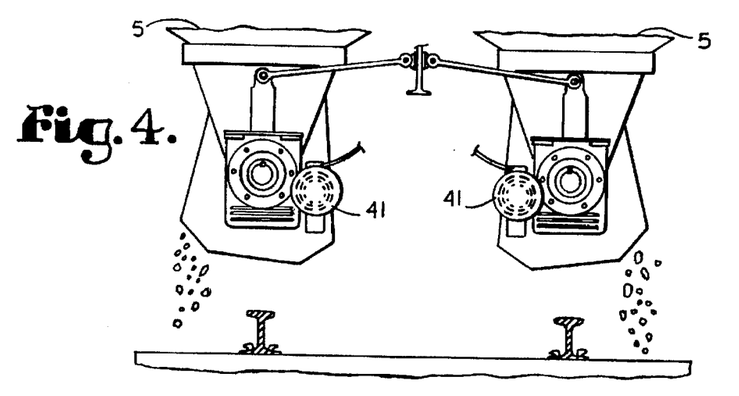
FIG. 4 is an enlarged end view of a pair of hopper door control apparatuses mounted on a ballast car with a set of railroad tracks shown beneath them.
Figure 5:
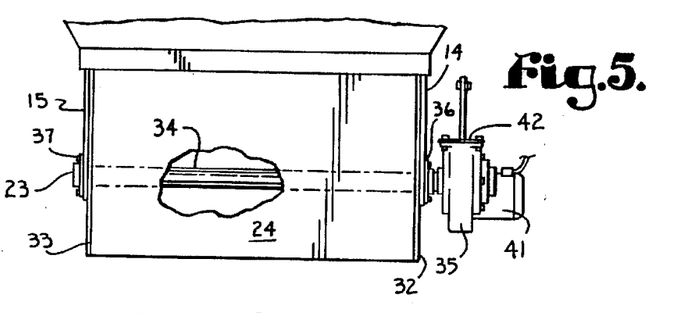
FIG. 5 is an enlarged side elevational view of the discharge control member, transmission and motor, with portions broken away to illustrate the drive shaft.

A single radio receiver 52 (FIG. 1) is mounted on the railroad car 2 in a position which permits radio reception to an antenna 56 with minimal interference from the body of the car 2. The receiver 52 is a conventional receiver capable of receiving an RF signal and decoding a digital address and control signal modulated thereon. Each car 2 has up to four hoppers 5, (two of which are shown in FIG. 4) each of which has a discharge opening 11 and a discharge control assembly 12 including a motor 41. Each motor 41 is connected to the radio receiver 52 via a control and power supply cable 53. The radio receiver 52 can selectively control any of the reversible motors 41 to operate in either direction, thus opening or closing a gap on either side of the associated discharge opening 11. Control of each individual motor 41 is via a pair of conventional corresponding relays 71–78 in a relay bank 70 (FIG. 7) which selectively power the motor or motors 41 in one direction or the other.

Figure 1:
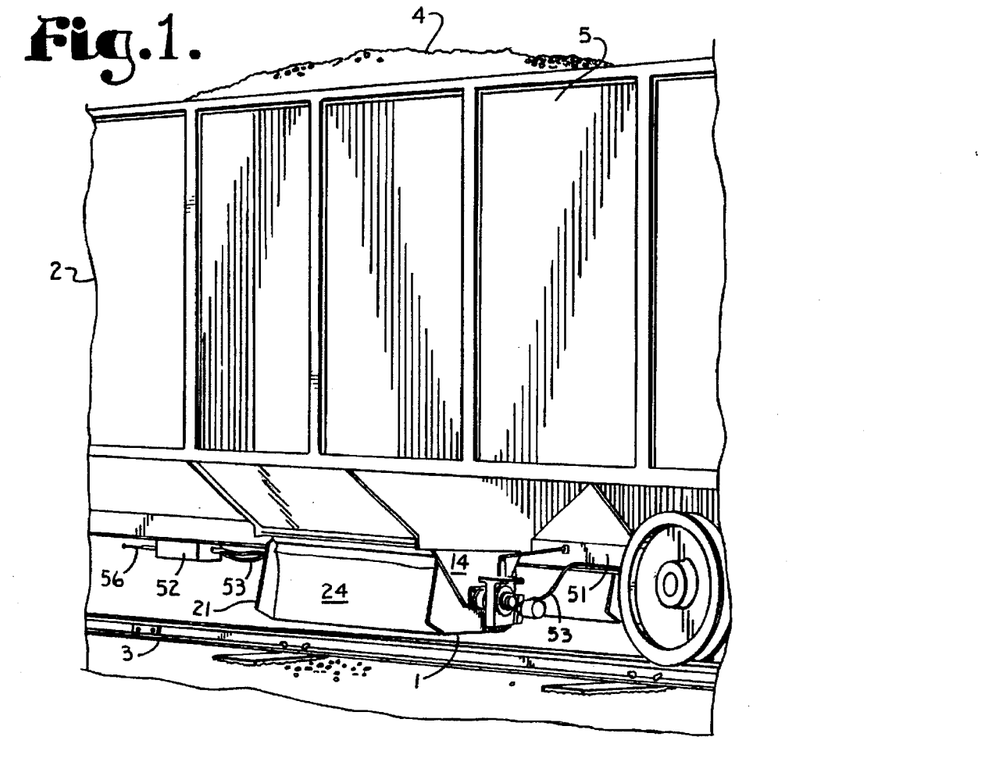
FIG. 1 is a fragmentary perspective view of a railroad ballast car equipped with a hopper door control apparatus according to a first embodiment of the present invention.
Figures 2, 3:
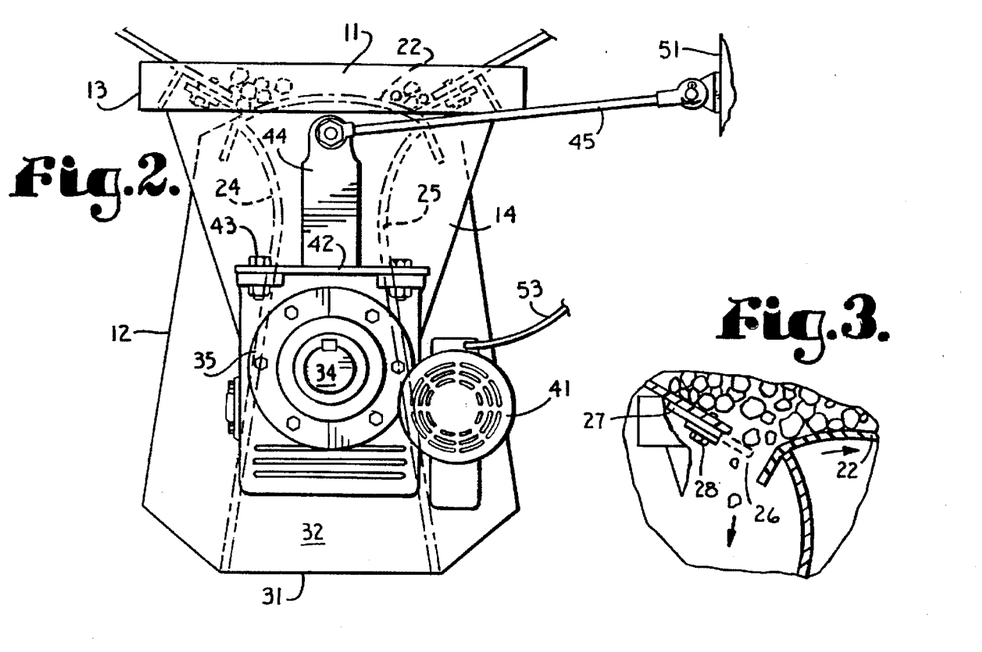
FIG. 2 is an enlarged end view of the hopper door control apparatus of FIG. 1 with the angled side walls and the arcuate top of the discharge control member shown partially in phantom lines.
FIG. 3 is an enlarged fragmentary view of a discharge control member pivoted clockwise to partially open the hopper door.

FIG. 3 depicts one side of the discharge opening 11 with the discharge control member 21 pivoted in the direction of the arrow, this opening a gap 26 between the adjustable steel plate 27 and the arcuate top surface 22. The ballast 4 is thus gravity fed through the gap 26 and along the channel defined by the side wall 24 and the end walls 32 and 33. As the discharge control member 21 is pivoted further to the right, the gap 26 is widened, thus allowing a greater volume of the ballast 4 to be fed through. The adjustable steel plate 27, which can be an inch thick, is adjustable via slots in the plate (not shown) which engage a bolt 28 attached to the hopper 5. The plate 27 is shown in an extended position in phantom lines.

Figure 6:
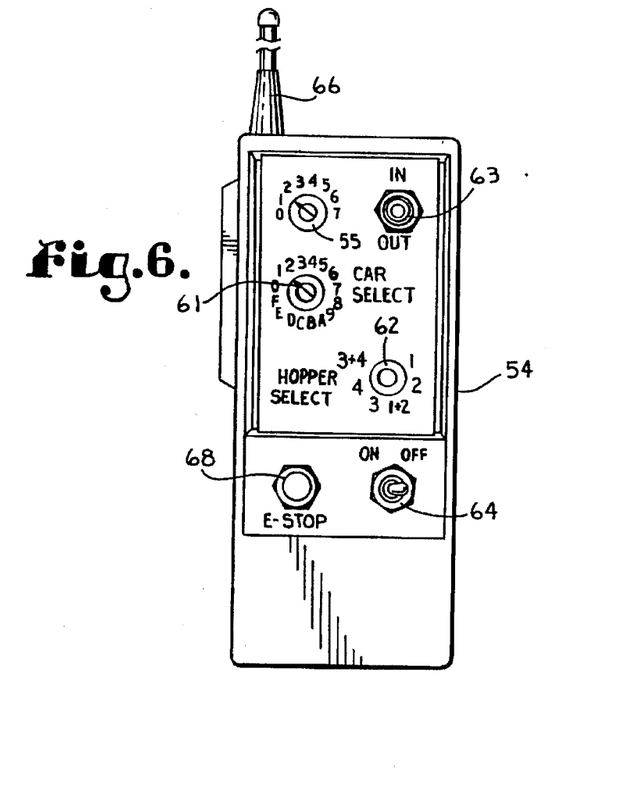
FIG. 6 is a frontal view of a remote control transmitter and keyboard.
Figures 7, 8, 9:
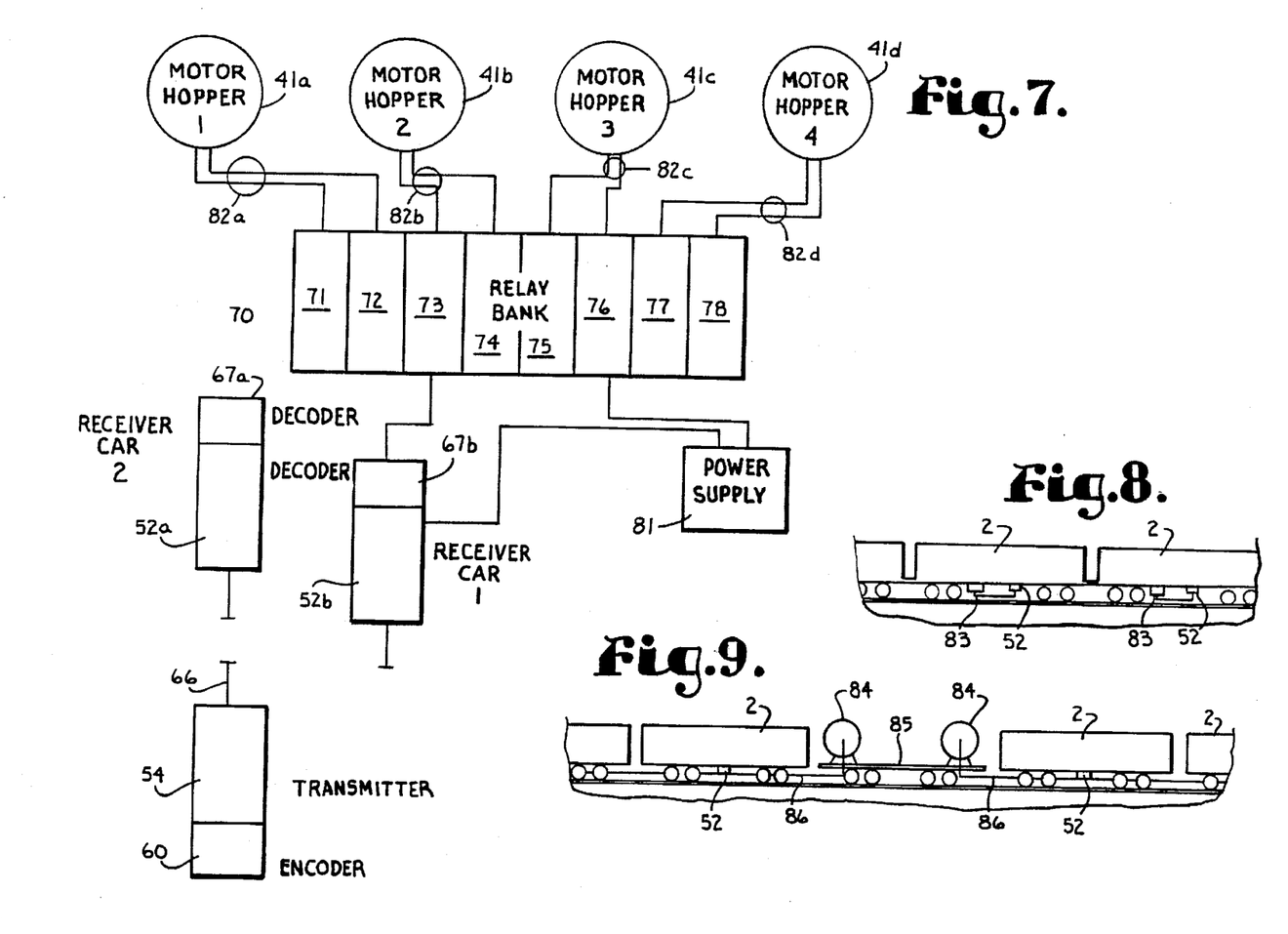
FIG. 7 is a block electrical schematic diagram of a hopper door control system.
FIG. 8 is a reduced side-elevational view of a portion of a train with individual batteries used as hopper door control power supplies.
FIG. 9 is a reduced side-elevational view of a portion of a train with common generators used as hopper door control power supplies.

FIG. 6 illustrates a front control panel for a remote radio control transmitter 54. FIG. 7 is a block electrical schematic of the transmitter 54 with a pair of remote receivers 52a and 52b. The receiver 52b for car 1 is shown complete with a relay bank 70 including eight control relays 71–78. It should be understood that each receiver 52 controls a similar relay bank 70, and that there are as many receivers 52 as there are ballast hopper cars 2 in a train. Referring to FIGS. 6 and 7, a pair of rotary switches 55 and 61 are operative to select a remote receiver 52 on a particular hopper car 2 in a train of such cars. The selection can be accomplished by, for example, encoding and transmitting a unique digital address via an encoder 60 connected to the transmitter 54 to which only the selected receiver 52 will respond. A third rotary switch 62 is for selecting a particular hopper or pair of hoppers 5 on the selected car 2. As shown in FIG. 4, a pair of the hoppers 5 can be jointly controlled for dumping ballast inside or, alternatively, outside of the rails 3. An IN/OUT toggle switch 63 is used to send an "IN" or "OUT" signal to pivot the selected discharge control member to the inside or the outside of the rails 3. An ON/OFF switch 64 is provided for the transmitter 54 and an Emergency Stop switch 65 sends a stop signal to the selected receiver 52. The receiver 52 then immediately stops all motors 41 on the selected car 2. An RF antenna 66 is mounted on the transmitter 54.

The selected receiver 52 with an associated decoder 67, which is assumed to be the receiver 52b and decoder 67b of car 1 in FIG. 7, causes one or more of the relays 71–78 to connect power from a power supply 81 to a selected one of or a pair of the motors 41a–41d. Each of the motors 41a–41d is connected via a respective wire pair 82a–82d to a pair of the relays 71–78. For example, the motor 41a in hopper 1 is connected to relays 71 and 72. Depending upon which direction of rotation is selected by the IN/OUT toggle switch 63, the relay 71 or the relay 72 is enabled to selectively switch power to the motor 41 a to cause it to rotate in the selected direction. If a pair of the hoppers 5 are selected via the hopper select switch 62, then a pair of the relays 71–78 are enabled by the addressed receiver 52b.

Digital signalling from the transmitter 54 to the selected receiver 52 can be accomplished by any conventional digital coding technique which modulates an RF signal. Pulse width modulation is one of several suitable signalling schemes.

FIGS. 8 and 9 are alternative illustrations of power supply sources for a train containing multiple hopper cars 2, each of which includes a receiver 52 attached thereto. In FIG. 8, each hopper car 2 includes a self-contained battery 83 for powering the receivers 52 and associated relays 71–78 and motors 41. In FIG. 9, a common generator 84, or a pair of such generators 84, are carried on a special car 85, with a common power supply cable 86 providing power to each ballast hopper car 2. Of course, generator power can be provided from a locomotive (not shown) or another common generator source as well.

The operation of the hopper control apparatus 1 will now be described with reference to FIGS. 1–7. A train including a plurality of the ballast hopper cars 2 is positioned onto a pair of the rails 3 which need additional ballast. As the train moves along the rails 3, the first hopper car 2 in the train is selected remotely by an operator, who, for example, may be stationed in the locomotive, by operating the rotary switches 55 and 61 on the transmitter 54. Operation of the correct rotary switch combination causes the transmitter 54 to attach a digitally coded address to any subsequent control message. When the correct car 2 is selected via the rotary switches 55 and 61, the correct hopper 5 and the desired discharge direction must be selected. If, for example, ballast 4 is needed on the outside of both of the rails 3, the rotary hopper select switch 62 is turned to the Nos. 1+2 position. The IN/OUT toggle switch 63 is then flipped to the OUT position and held for a set time. This combination of rotary switch positions for the switches 55, 61 and 62 and the pushing of the toggle switch 63 causes the transmitter 54 to send a digitally encoded signal which includes a leading receiver address sequence and a motor control signal to cause the selected receiver 52b to enable the relays 71–74 to control the motors 41a and 41b in the hoppers 1+2 in a manner to turn the discharge control members 21 in the selected hoppers 5 outward. The receiver 52b in car 1 recognizes the lead address and responds to the digital signal in the desired fashion. As long as the IN/OUT toggle switch 63 is held in the OUT position, the digital signal is repeated and the motors 41a and 41b are continuously turned in the selected direction. When the toggle switch 63 is released, the digital control signal ceases and the relays 71–74 are opened, stopping the motors 41a and 41b, with the discharge control members 21 held in the selected position. Ballast 4 is thus distributed along the outside of the rails 3 as the train moves. When the selected Nos. 1+2 hoppers 5 on the selected car 2 are empty, the rotary switch 62 is turned to the No. 3+4 position and the IN/OUT toggle switch 63 is again toggled to OUT for a set period. The receiver 52b in car 1 thus controls the relays 75–78 in a fashion which causes the motors 41c and 41d in hoppers 3+4 to turn outward. Similarly, when all four of the hoppers 5 on the first car 2 in the train are empty, the receiver 52a in the second car is selected via the rotary switches 55 and 61 and the process is repeated. If ballast 4 is needed on only one side of one of the rails 3, only one of the four hopper motors 41a–41d is selected and controlled accordingly, and, conversely, if ballast 4 is needed both inside and outside both of the rails 3, the discharge control members 21 on hoppers 1+2 can be pivoted outward while the control members 21 on hoppers 3+4 are pivoted inward, thus distributing ballast 4 inside and outside of both of the rails 3.

SECOND BALLAST CAR EMBODIMENT WITH BALLAST DISTRIBUTING BLADES

Figure 10:
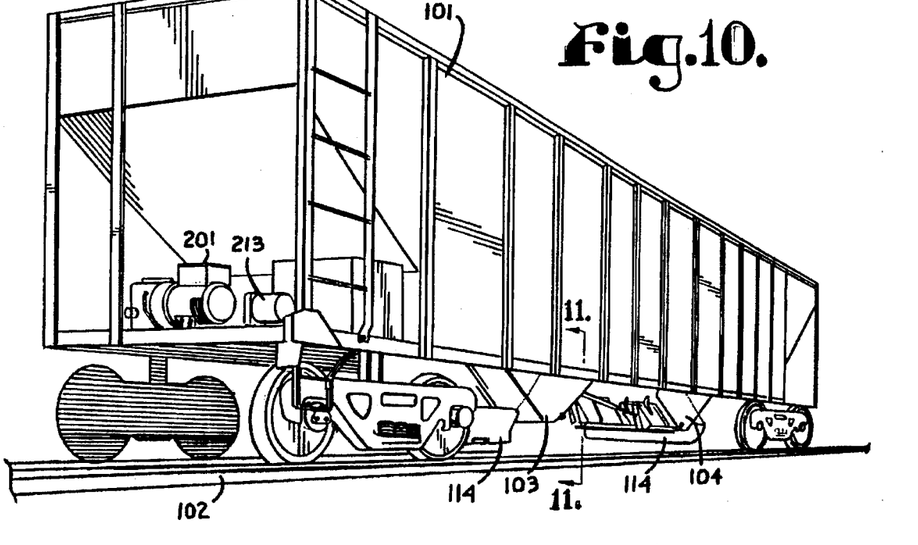
FIG. 10 is a perspective view of a railroad ballast hopper car incorporating a pair of ballast distributing blades.
Figure 11:
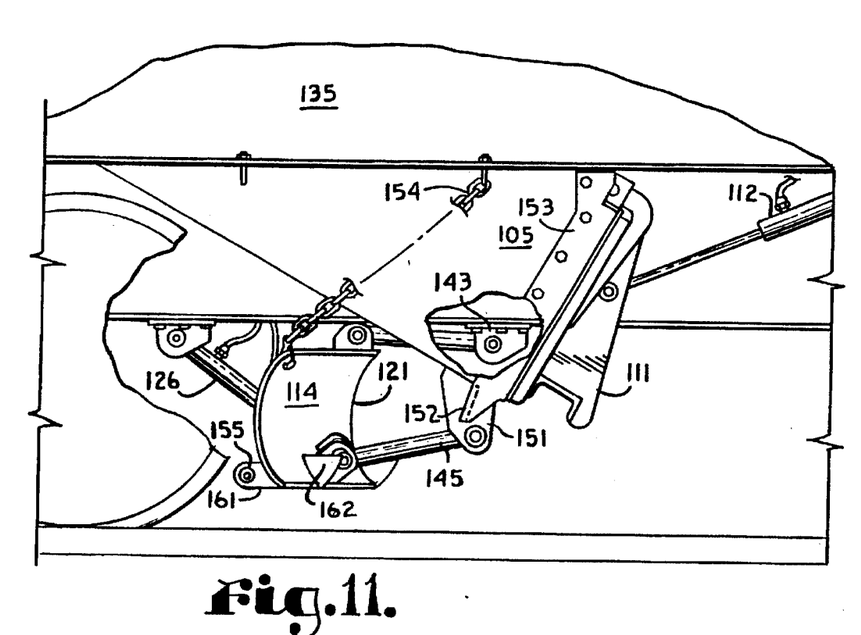
FIG. 11 is an enlarged, fragmentary cross-sectional view of the hopper car of FIG. 10, taken along line 11—11 of FIG. 10, and illustrating the hopper doors closed, an associated ballast distributing blade raised to a non-operative position, with a safety chain secured for transport and with portions broken away to illustrate details of the connection of the blade to the railroad car.
Figure 12:
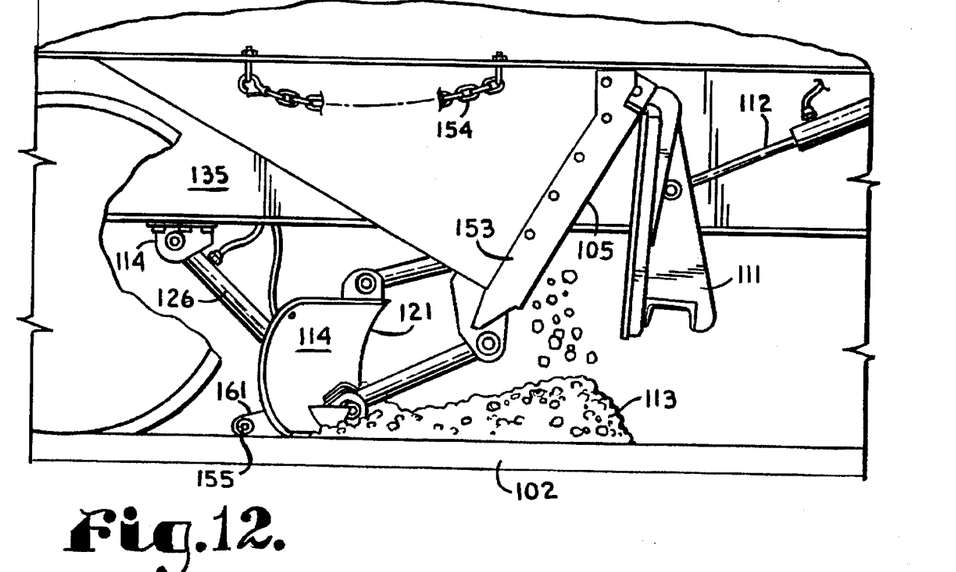
FIG. 12 is an enlarged, fragmentary cross-sectional view of the hopper car of FIG. 10, taken along line 11—11 of FIG. 10, and illustrating the hopper doors opened with ballast dropping out, the associated ballast distributing blade lowered to a ballast distributing position and with the safety chain released.

Referring to FIGS. 10–17, a second embodiment of a railroad ballast car and control system is disclosed. In FIG. 10, a railroad hopper car 101 is shown positioned on a pair of rails 102. A pair of hoppers 103 and 104 are each equipped with a pair of hopper discharge outlets 105, as shown in more detail in FIGS. 11 and 12. The car 101 is conventional and includes a number of hopper doors 111, one for each of the discharge outlets 105. Each of the doors 111 is selectively movable between a closed position, as shown in FIG. 11 and an open position, as shown in FIG. 12 via a hydraulically operated cylinder and piston 112. When the hopper doors 111 are opened, as shown in FIG. 12, ballast 113 is dropped onto and between the rails 102. This dropped ballast must be distributed to the correct locations inside and outside the rails 102.

In order to efficiently distribute the ballast 113, a pair of ballast distributing blades 114 are attached to the car 101. Each blade 114 is positioned just inside a respective wheel carriage 115 on either end of the car 101. Each blade 114 is shaped as a shallow V with a center portion 121 of each respective V projecting inward toward the center of the car 101, as shown in FIG. 11. This arrangement insures that a correctly oriented blade 114 will be available for distributing ballast from the car 101 regardless of the direction of travel of the car 101.

Figure 13:
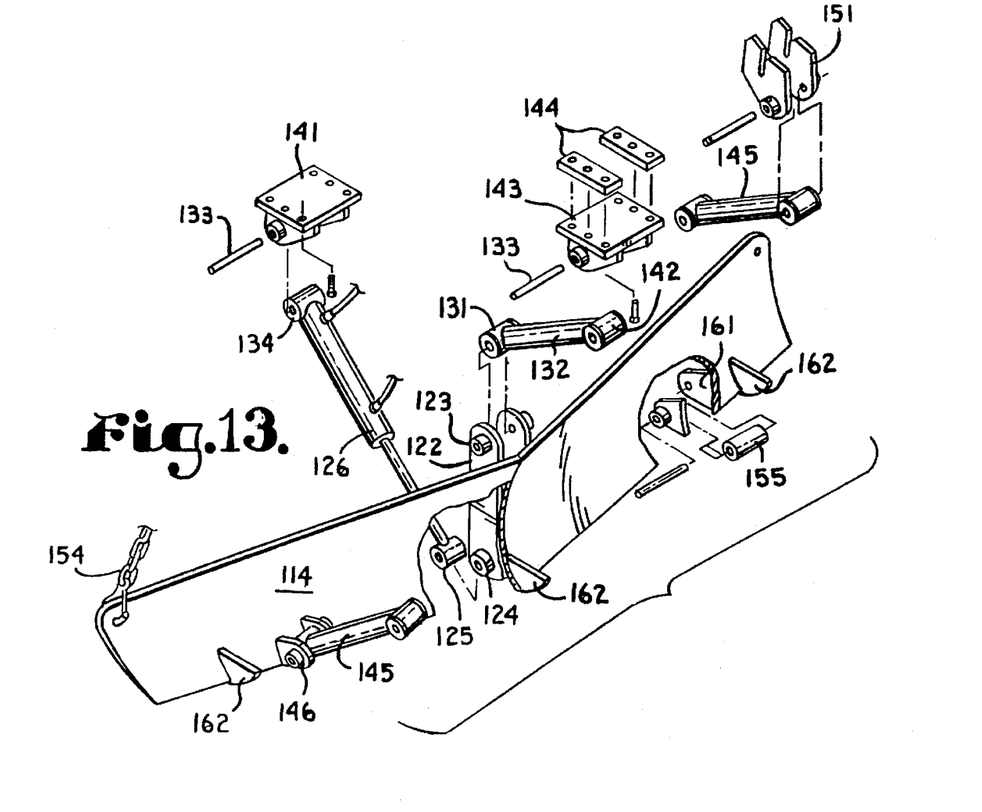
FIG. 13 is an enlarged, exploded perspective view of a ballast distributing blade, illustrating the various components thereof.

The blades 114 are identical and their placement within the car 101 is symmetrical, so that only one of the blades 114 is illustrated in FIGS. 11–13. Referring to FIGS. 11–13, the blades 114 each include a centered, vertically oriented pivot mount 122, with upper and lower pivot connections 123 and 124, respectively. A lower end 125 of a blade elevating hydraulic cylinder 126 is attached to the lower pivot mount 124 while a lower end 131 of a center pivot arm 132 is attached to the upper pivot mount 123, each pivot connection being made via removable pins 133. An upper end 134 of the cylinder 126 is pivotally connected to a center structural member 135 of the car 101 via a mounting plate 141 while an upper end 142 of the center pivot arm 132 is connected to the same structural member 135 via a mounting plate 143. Vertical adjustment of the plates 141 and 142 is accomplished via spacer plates 144. A pair of side pivot arms 145 are each pivotally attached to a pair of pivot mounts 146 welded or otherwise attached to the front of the blade 114 near each side thereof. Only one of the mounts 146 is illustrated in FIG. 13, the other having been broken away to illustrate details of the mounting structure on the rear of the blade 114. Each of the side pivot arms 145 is pivotally attached via a pair of mounting plates 151 to a flange member 152 (shown in phantom lines in FIG. 11) which is welded between a pair of plates 153 surrounding the discharge opening 105.

Referring to FIGS. 11 and 12, again, when the cylinder 126 is retracted, the blade 114 is raised to the position shown in FIG. 11 as the pivot arm 132 and the pivot arm pair 145 are all pivoted upward. In this raised, non-operative position, the blade 114 can be secured for transport via a safety chain 154. FIG. 12 illustrates the safety chain 154 removed from the blade 114 and the cylinder 126 in the extended position, lowering the blade 114 to a ballast distributing position. As the ballast 113 is dropped from the hopper 126, it piles up on and between the rails 102, and the blade 114 then forces the ballast off of the rails 102 to either side and between the rails 102 where it is needed. In order to keep the blade 114 from directly contacting the rails 102, a pair of rollers 155 are attached between respective mounting plates 161 attached behind the blade 114. As shown in FIG. 12, the roller mounting plates 161 are angled down slightly and are spaced to allow the rollers to contact the respective rails 102 to thereby support the blade in a position in which it is slightly suspended above the rails 102. A plurality of cambered ears 162 are attached to the front of the blade 114. The ears 162 cause the blade 114 to ride up and over obstructions such as road crossings, switch tracks, etc.

Figure 14:
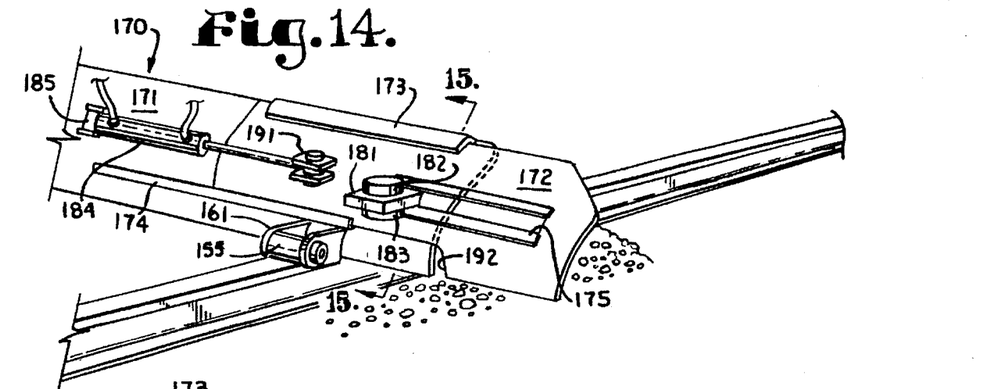
FIG. 14 is a fragmentary perspective view of a modified ballast distributing blade, illustrating one of a pair of retractable blade wings extended.
Figures 15, 17:
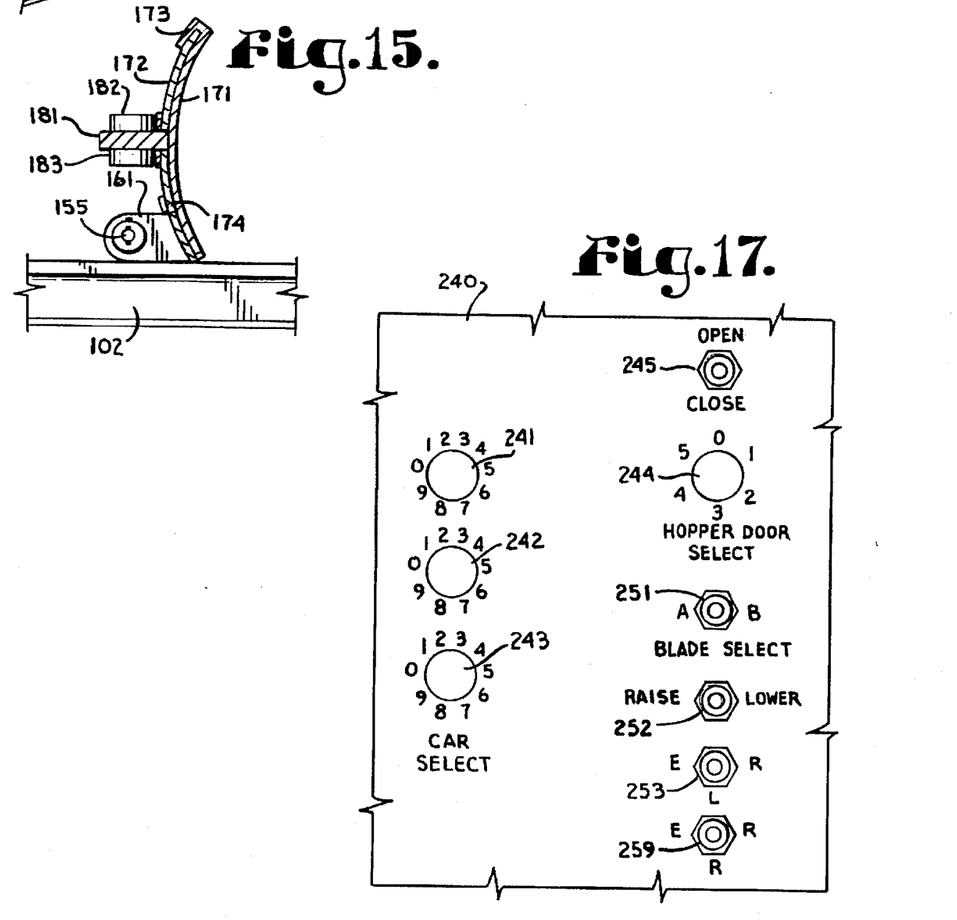
FIG. 15 is an enlarged, cross-sectional view of the modified ballast distributing blade, taken along line 15—15 of FIG. 14, and illustrating the relative positions of the fixed blade and one extendable wing.
FIG. 17 is a fragmentary frontal view of the control keyboard for a remote control transmitter adapted for remotely controlling the system of FIG. 17.

Referring to FIGS. 14 and 15, a modified ballast distributing blade assembly 170 is illustrated. The blade assembly 170 includes a fixed blade 171 which is sized and shaped similarly to the blade 114 of FIGS. 10–13. The blade assembly 170 is symmetrical, and thus only one side is shown. In certain applications, such as parallel tracks, railroad yards, etc., it is often necessary to spread ballast well beyond the rails. However, railroad rolling stock is constrained to maximum widths to provide adequate side clearances. For example, in the United States, railroad cars cannot exceed 109" in width. This means that the nominal width of the ballast distributing blades 171, during transport, cannot exceed this width. In order to provide an expanded width for spreading gravel well beyond the rails 102, a symmetrical pair of retractable blade wings 172, of which only one is shown in FIG. 14, are mounted behind the fixed blade 171. Each wing 171 is supported between an upper track 173 and a lower track 174 which are welded to the fixed blade 171. Each wing 172 includes a slot 175 through which a horizontal bearing mounting plate 181 extends. The mounting plate 181 is welded to the rear of the fixed blade 171 and has mounted thereon upper and lower bearings 182 and 183 to provide support to the wing 172 as it is extended and retracted. Selective extension and retraction of the wing 172 is accomplished via a double action hydraulic cylinder 184 which is attached at one end to a mounting bracket 185 on the rear of the fixed blade 171 and at the other end to a mounting bracket 191 on the rear surface of the wing 172. The wing 172 includes a notch 192 along the bottom to accommodate the roller 155 and roller mounting bracket 161 as the wing 172 is extended and retracted. In one embodiment, each wing 172 provides up to a 12" extension on either side of the fixed blade 171 for a potential total blade width of 133".

Figure 16:
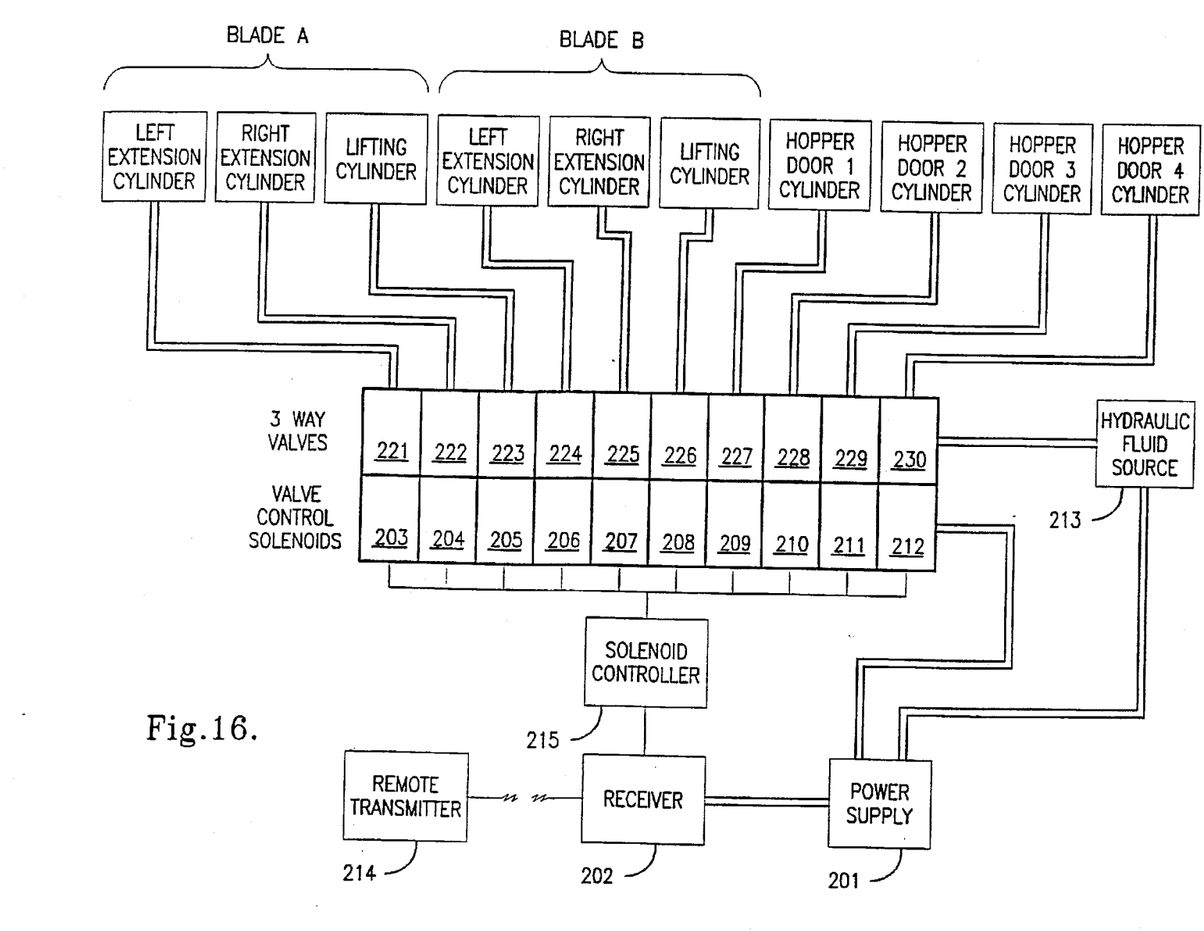
FIG. 16 is an electrical and hydraulic block diagram illustrating a remote control system for the railroad car of FIG. 10.

FIG. 16 illustrates an electrical and hydraulic block schematic diagram for controlling the cars of FIGS. 18–25. A power supply 201, which may be a car mounted generator as shown in FIG. 10, provides electrical power to a car mounted radio receiver 202, a plurality of valve control solenoids 203–212, and a hydraulic fluid pump 213. A remote hand held radio transmitter 214 provides selective and individual control of all of the hydraulic cylinders on the cars, as well as allowing different cars in a train to be selected for control. The receiver 202 is connected to a solenoid controller 215, which may be a programmable logic controller, for example. The solenoid controller 215 is programmed to selectively provide electrical control signals to the valve control solenoids 203–212 to thereby selectively control a like plurality of 3 way hydraulic valves 221–230. Each of the valves 221–230 is connected to a respective double action hydraulic cylinder via a pair of hydraulic lines, including actuating cylinders for the left and right extendable wings 172 on ballast distributing blade assemblies 170, here designated as blades "A" and "B", as well as the lifting cylinders 126 for each blade. In addition, individual hopper door control cylinders for each discharge control member on the cars, here shown as numbering four, are controlled by the remaining valves 227–230 via the solenoids 209–212, respectively.

FIG. 17 illustrates an exemplary keyboard 240 for the remote control transmitter 214, which in all other respects resembles the transmitter 54 shown in FIG. 6. On the left side of the keyboard 240 are three rotary car selection dials 241–243, each with selectable numbers 0–9. By using the dials 241–243 in tandem, a three digit decimal number can be used to uniquely select one of up to 1000 cars for control. Once the car select dials 241–243 are set, a specific and unique car select address code is transmitted to all of the cars on a given train, but only the addressed car will respond to subsequent control signals. These control signals are sent via a hopper door rotary select dial 244, here shown as having 6 selectable hopper doors 1–6. Once a hopper door is selected via the dial 244, an open/close toggle switch 245 is used to open or close the selected hopper door. Next, a blade select toggle switch 251 is used to select the appropriate blade A or B depending upon the direction of travel of the railroad car. Once either blade A or B is selected, a toggle switch 252 can be used to selectively raise or lower the blade. If the selected car is equipped with an extendable blade, such as the blade assembly 170 in FIGS. 14 and 15, then a pair of blade extension/retraction toggle switches 253 and 254 are provided to selectively extend or retract the left and right blade wings, respectively. As in the transmitter 54 of FIG. 6, the combination of rotary switch positions for the switches 241–244 and the pushing of the toggle switches 245 and 251–254 causes the transmitter 214 to send a digitally encoded signal which includes a leading receiver address sequence, a hopper door select sequence, a blade select sequence and one or more hydraulic actuator control signals to cause the selected receiver 202 to enable the solenoids 203–212 to control their respective hydraulic valves 221–230. The receiver 202 in the selected car 101 recognizes the lead address and responds to the digital signals in the desired fashion.

ALTERNATIVE BALLAST CAR EMBODIMENTS WITH BALLAST DISTRIBUTING BLADES

Figure 18:
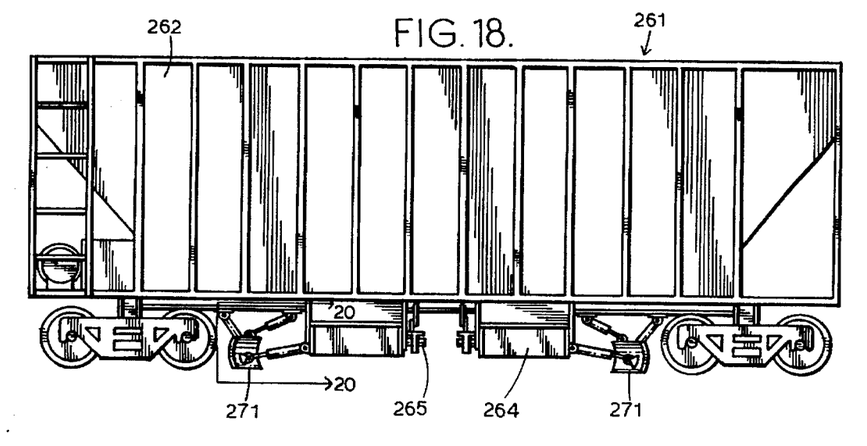
FIG. 18 is a side elevational view of a first alternative railroad ballast hopper car incorporating a pair of end mounted ballast distributing blades and hopper discharge control members for selectively directing ballast inside of or outside of the rails.
Figure 19:
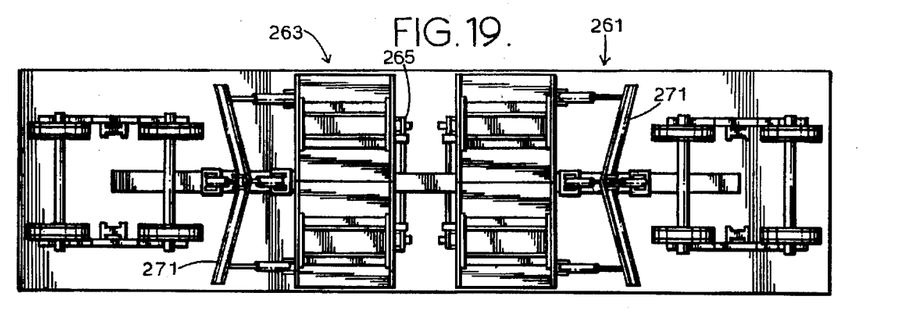
FIG. 19 is a bottom plan view of the railroad ballast hopper car of FIG. 18.
Figure 20:
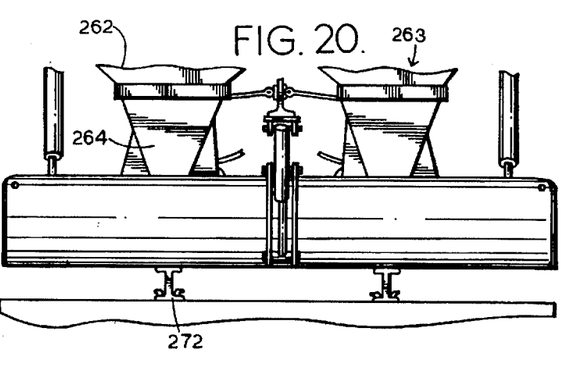
FIG. 20 is a cross-sectional view of the railroad ballast hopper car of FIG. 18, taken along line 20—20 of FIG. 19.

Referring to FIGS. 18–20, a first alterative ballast railcar 261 is illustrated. It should be noted that the railcar 261 is not necessarily drawn to scale, but is scaled instead for efficiently illustrating the current invention. The railcar 261 includes four hoppers 262 with each hopper 262 including a bottom discharge opening 263 and a hopper discharge control assembly 264. Each of the hopper discharge control assemblies 264 is essentially identical to the hopper discharge control assembly 12 in FIGS. 1–5 except that a drive motor 265 is preferably a reversible hydraulic motor rather than the reversible electric motor 41. A pair of ballast distributing blades 271 are positioned outside of the four hopper discharge control assemblies 264 with each blade 271 being essentially identical to the blade 114 of FIGS.

10–15. On the railcar 261, the blades 271 face in the same directions as the blades 114 of FIG. 10. Referring to FIGS. 18 and 20, the railcar 261 has the added advantage of the ability to selectively distribute ballast from the hoppers 262 either inside of outside of the rails 272 over which the respective hopper discharge control assembly 264 is centered. Thus, for example, where supplemental ballast is needed only outside of the rails 272, the hopper discharge assemblies 264 are turned to the outside. Thus, ballast is distributed only outside of the rails 272 by the blades 271, either with or without wings such as the wings 172 (FIG. 14). Of course, although not shown, should ballast be needed only inside the rails 272, or outside one rail 272 but inside the other, the discharge control assemblies 264 can be oriented accordingly.

Figure 21:
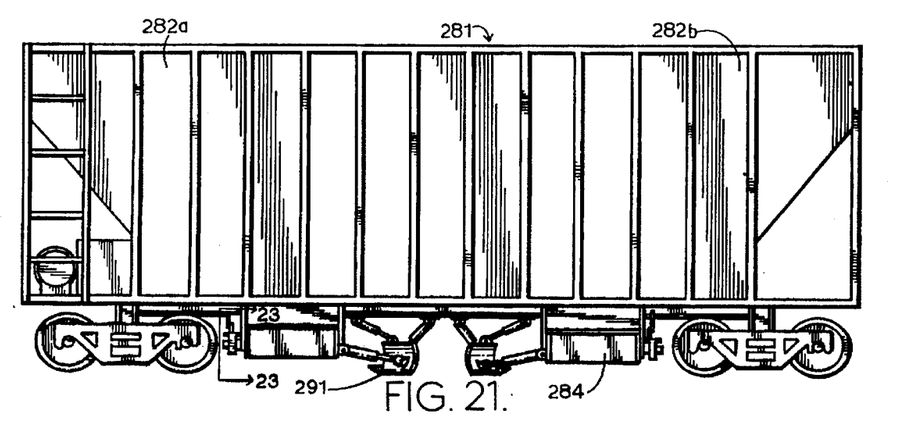
FIG. 21 is a side elevational view of a second alterative railroad ballast hopper car incorporating a pair of center mounted ballast distributing blades and elongate hoppers and associated discharge control members for selectively directing ballast inside of or outside of the rails.
Figure 22:
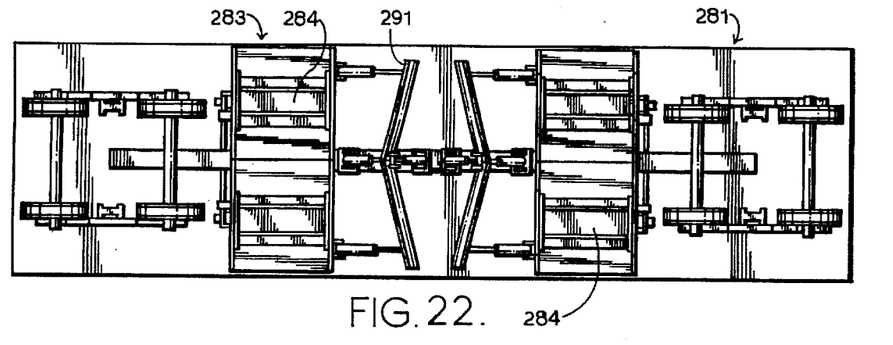
FIG. 22 is a bottom plan view of the railroad ballast hopper car of FIG. 21.
Figure 23:
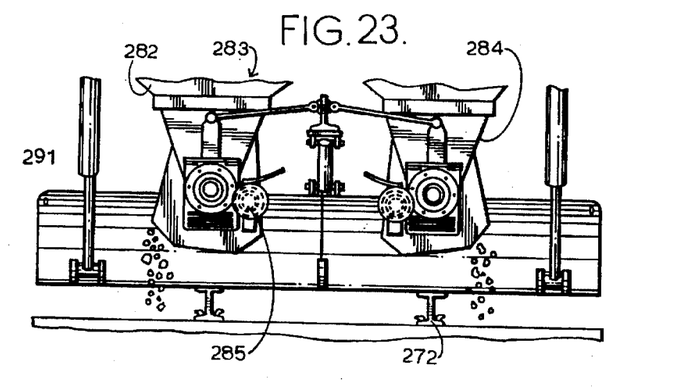
FIG. 23 is a cross-sectional view of the railroad ballast hopper car of FIG. 21, taken along line 23—23 of FIG. 21, and illustrating ballast being distributed outside of the rails and being spread by one of the distributing blades.

Referring to FIGS. 21–23, a second alternative ballast railcar 281 is illustrated. Again, the railcar 281 is not necessarily drawn to scale, but is scaled instead for efficiently illustrating the current invention. The railcar 281 is similar to the railcar 261 in that it includes four hoppers 282 with each hopper 282 including a bottom discharge opening 283 and a hopper discharge control assembly 284. Again, each of the hopper discharge control assemblies 284 is essentially identical to the hopper discharge control assembly 12 in FIGS. 1–5 except that a drive motor 285 is preferably a hydraulic motor rather than the reversible electric motor 41. A pair of ballast distributing blades 291 are positioned inside of the four hopper discharge control assemblies 284 with each blade 291 being essentially identical to the blades 114 of FIGS. 10–15. However, unlike the railcar 261, on the railcar 281, the blades 291 face opposite each other in directions opposite to those of blades 114 of FIG. 10. Referring to FIGS. 21 and 23, as in the railcar 261, the railcar 281 has the added advantage of the ability to selectively distribute ballast from the hoppers 282 either inside of or outside of the rails 272 over which the respective hopper discharge control assembly 284 is centered. In addition, the railcar 281, with the blades 291 being positioned inside of the hopper discharge control assemblies 284, allow ballast to be distributed from a first pair of hoppers, such as 282a (FIG. 21), in large quantities either inside of or outside of the rails 272 while the second pair of hoppers 282b are used for "sprinkle dumping" in which relatively small quantities of ballast are "sprinkled" behind the distributing blade 291 to fill in minor gaps and holes, or to simply even out the surface of the ballast along the rails 272. This operation cannot be accomplished with a single railcar with the blades positioned outside of the hoppers, such as the railcar 261.

Figure 24:
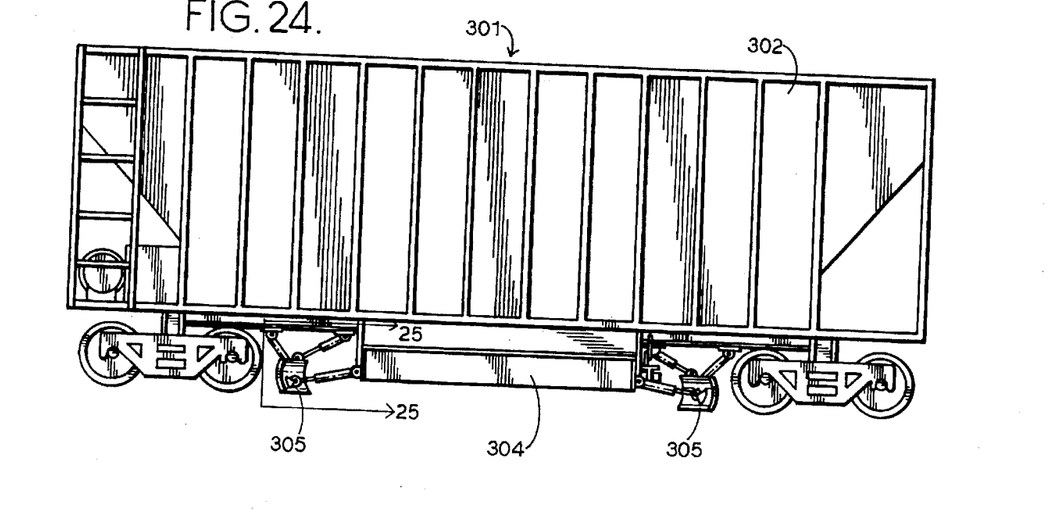
FIG. 24 is a side elevational view of a third alternative railroad ballast hopper car incorporating a pair of end mounted ballast distributing blades and a single pair of elongate hoppers and associated discharge control members for selectively directing ballast inside of or outside of the rails.
Figure 25:
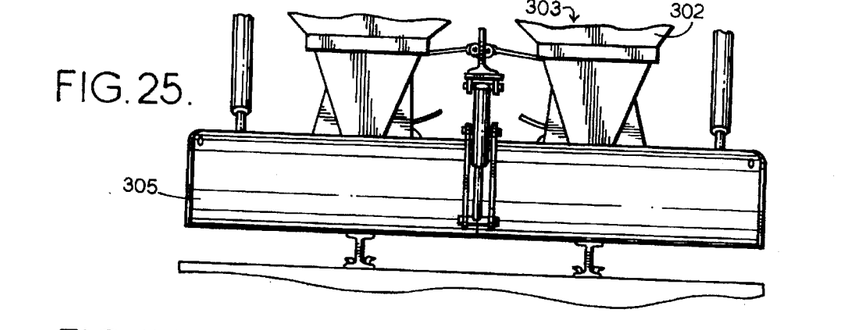
FIG. 25 is a cross-sectional view of the railroad ballast hopper car of FIG. 21, taken along line 25—25 of FIG. 24.

Referring to FIGS. 24 and 25, a third alternative ballast railcar 301 is illustrated. The railcar 301 includes a pair of large hoppers 302 with each hopper 302 extending the length of the railcar 301 and including a centered elongate bottom discharge opening 303 and an elongate hopper discharge control assembly 304. Each of the hopper discharge control assemblies 304 is essentially identical to the hopper discharge control assemblies 264 and 284 in FIGS. 18–23 except for the length. The discharge openings 303 and discharge control assemblies 304 must be long enough to accommodate off loading the hoppers 302. As in the smaller discharge control assemblies 264 and 284 of FIGS. 18–23, the railcar 301 also has the added advantage of the ability to selectively distribute ballast from the hoppers 302 either inside of outside of the rails 272 over which the respective hopper discharge control assembly 304 is centered. A pair of ballast distributing blades 305 are provided outside of the position of the discharge control assemblies 304.

ALTERNATIVE POWER SOURCES FOR HYDRAULIC SYSTEMS

Figure 26:
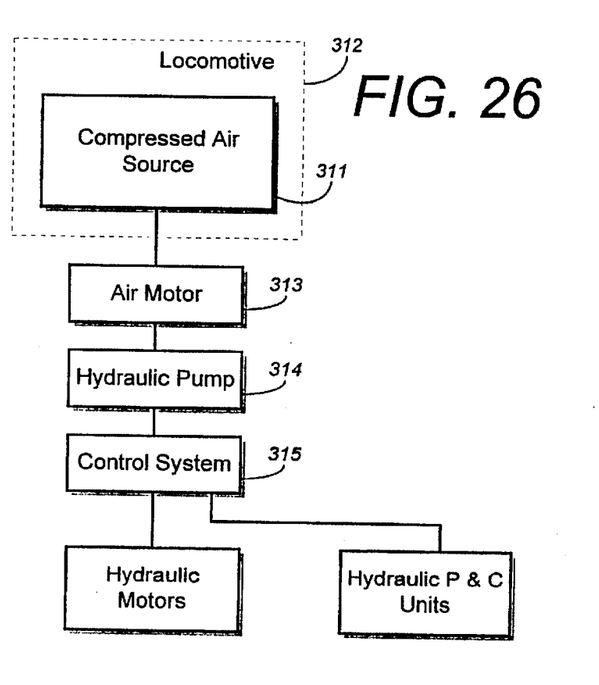
FIG. 26 is a block schematic diagram of a first alternative power source and hydraulic control arrangement for the railroad cars of FIGS. 18–24.

Referring to FIG. 26, a first block schematic diagram for a power source and hydraulic control system includes an air compressor 311, which can be, for example, the integral air compressor provided with a locomotive 312 to drive air brakes and other pneumatic systems on a train. The compressor 311 is connected to an air motor 313 which is connected to directly drive a hydraulic pump 314. A control system 315 selectively provides hydraulic fluid under pressure from the pump 314 to the hydraulic motors 305 and the hydraulic piston and cylinder units, such as the blade lifting cylinders 126, and the blade extension cylinders 184. The control system 315 can take the form of the system illustrated in FIG. 16 with selective remote control of solenoids 203–212 and valves 221–230 provided by a transmitter similar to the transmitter 214 and a receiver similar to the receiver 202.

Figure 27:
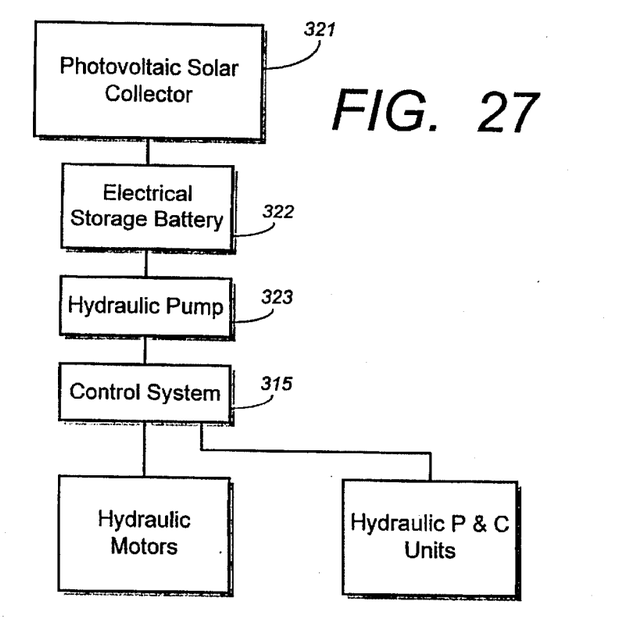
FIG. 27 is a block schematic diagram of a second alternative power source and hydraulic control arrangement for the railroad cars of FIGS. 18–24.

Referring to FIG. 27, a power system similar to the system shown in FIG. 22 includes a photovoltaic solar collector 321, which can be mounted on top of a railcar such as the car 261, for example. The collector 321 converts solar energy to electrical energy in a known fashion for charging an electrical storage battery 322. The battery 322, in turn, provides power to an electrically driven hydraulic pump 323, with the remainder of the system being identical to the system of FIG. 22.

In preferred embodiments, the motor 41 and transmission 35 was a Gearmotor by Helical-Bevel Corp., the pivoting discharge control member 21 was a Ballast Door Size C-45 by Morrison-Knudsen Corp., and the radio transmitters 54 and 214 and receivers 52 and 202 were CATTRON CAT-824E-01 by Cattron, Inc. operating in a frequency range of 450–470 MHz, in which up to 126 unique addresses can be transmitted for each RF channel.

While a digital address signalling scheme has been described for selecting individual cars on a train, it should be apparent that utilizing different carrier or modulating frequencies for each car, or any other suitable manner of selecting individual receivers from a group of such receivers could be employed as well.

It is to be understood that while certain forms of the present invention have been illustrated and described herein, it is not to be limited to the specific forms or arrangement of parts described and shown.

What is claimed and desired to be secured by Letters Patent is as follows:

1. A ballast distributing railroad hopper car including:
    (a) a pair of hoppers and associated hopper discharge control members, said discharge control members being selectively operable to distribute ballast from the respective hopper on the inside or the outside of a particular rail;
    (b) a pair of ballast distributing blades, each said blade being selectively movable between an upper, non-operative position and a lower, operative position;
    (c) a pair of blade operating means, each of which is associated with a respective one of said blades for selectively moving the respective blade between said operative and said non-operative positions;
    (d) a pair of hopper discharge control member operating means, each of which is associated with a respective one of said hopper discharge control members for selectively moving the respective hopper discharge control member between a center, non-discharge position and either of a side discharge position or a center discharge position;

(e) a receiver on said car connected to the door and blade operating means on that car, said receiver being responsive to coded control signals to selectively, independently and individually control positions of each of said hopper discharge control members and said blades; and (f) a mobile remote transmitter selectively operable to transmit said coded control signals to cause said receiver to control the connected discharge control member operating means and blade operating means.

2. An apparatus as set forth in claim 1, for use on a train including a plurality of railroad cars, each such car including a plurality of said hopper discharge control members and hopper discharge control member operating means and a plurality of said blades and said blade operating means and each such car being equipped with one of said receivers, wherein:

(a) each receiver is adapted to respond to a different coded receiver address signal; and (b) said remote transmitter is selectively operable to transmit any one of said coded receiver address signals along with said control signals to enable a selected one of said receivers.

3. An apparatus as set forth in claim 1, wherein:

(a) said hopper discharge control members each comprise a hydraulic motor and said blade operating means each comprise a hydraulic actuator.

4. An apparatus as set forth in claim 3, wherein:

(a) said car includes a power source and a hydraulic fluid pump.

5. An apparatus as set forth in claim 1, wherein:

(a) one of said pair of ballast distributing blades is attached between one of said hopper discharge control members and one end of said car.

6. An apparatus as set forth in claim 5, wherein:

(a) each of said ballast distributing blades is shaped as a V, with the center portions of the V blades on said car extending toward each other such that said car can distribute ballast in either direction on a railroad track.

7. An apparatus as set forth in claim 5, wherein:

(a) said ballast distributing blades are adjustable and each includes at least one wing portion which is extendable and retractable to selectively change the effective width of said blade.

8. An apparatus as set forth in claim 1, wherein:

(a) one of said pair of said ballast distributing blades is attached inside of a respective one of the hopper toward the center of said car.

9. An apparatus as set forth in claim 8, wherein:

(a) each of said ballast distributing blades is shaped as a V, with the center portions of the V blades on each car extending away from each other such that each ballast from one hopper or hopper pair can be off-loaded and distributed via one of said blades while ballast from a second hopper or hopper pair can be sprinkle dumped behind the distributing blades while said car is in motion in either direction on a railroad track.

10. On a train including a plurality of railroad cars, each car including a plurality of hopper discharge openings, each with a hopper discharge control member, and at least one ballast distributing blade attached beneath the car, said blade being movable between a non-operative position and an operative position, a control system for controlling each of said hopper discharge control members and each of said blades, said control system comprising:

(a) hopper discharge control member operating means associated with each said hopper discharge control member for selectively moving the respective hopper discharge control member between a center, non-discharge position and either of a side discharge position or a center discharge position;

(b) blade operating means associated with said blade for selectively moving said blade between said operative and said non-operative positions;

(c) a receiver on each car connected to each hopper discharge control member and blade operating means on that car, said receiver being responsive to coded control signals to selectively, independently and individually control positions of said hopper discharge control members and said blade, each said receiver being adapted to respond to a different coded address signal; and (d) a mobile remote transmitter selectively operable to transmit any one of said coded address signals and said coded control signals to cause a selected one of said receivers to control the connected hopper discharge control member and blade operating means.

11. An apparatus as set forth in claim 10, wherein:

(a) said hopper discharge control members each comprise a hydraulic motor and said blade operating means each comprise a hydraulic actuator.

12. An apparatus as set forth in claim 10, wherein:

(a) each said car includes an electrical generator and a hydraulic fluid pump.

13. An apparatus as set forth in claim 10, wherein:

(a) there are a pair of said ballast distributing blades on each said car, one blade being attached toward each end of each car, and each said blade has an independent blade operating means associated therewith.

14. An apparatus as set forth in claim 13, wherein:

(a) each of said ballast distributing blades is shaped as a V, with the center portions of the V blades on each car extending toward each other such that each said car can distribute ballast while said train is in motion in either direction on a railroad track.

15. An apparatus as set forth in claim 14, wherein:

(a) one or more of said ballast distributing blades is adjustable and includes at least one wing portion which is extendable and retractable to selectively change the effective width of said blade.

16. An apparatus as set forth in claim 10, wherein:

(a) there are a pair of said ballast distributing blades on each said car, one blade being attached inside of a respective one of each of the hopper discharge control members toward the center of said car, and each said blade has an independent blade operating means.

17. An apparatus as set forth in claim 16, wherein:

(a) each of said ballast distributing blades is shaped as a V, with the center portions of the V blades on each car extending away from each other such that each ballast from one hopper or hopper pair can be off-loaded and distributed via one of said blades while ballast from a second hopper or hopper pair can be sprinkle dumped behind the distributing blades while said train is in motion in either direction on a railroad track.

18. An apparatus as set forth in claim 17, wherein:

(a) said ballast distributing blades are adjustable and each includes at least one wing portion which is extendable and retractable to selectively change the effective width of said blade.

19. A method of selectively, independently and individually controlling a plurality of hopper discharge control members and one or more ballast distributing blades on a railroad hopper car, each said hopper discharge control member being selectively movable between a center, non-discharge position and either of a side discharge position or a center discharge position and each said blade being movable between an operative and a non-operative position, the method comprising the steps of:

(a) attaching a reversible power source to each said hopper discharge control member and each said blade;

(b) connecting a receiver to all of said power sources to selectively, independently and individually control the switching and direction of each of said power sources in response to uniquely encoded control signals; and (c) transmitting said encoded control signals to said receiver from a mobile remote transmitter.

20. The method of claim 19, wherein there are a plurality of hopper cars on a train, each car including a plurality of hopper discharge control members and blades, each car also including a respective one of said receivers, said method including the steps of:

(a) adapting each receiver to respond to a unique coded receiver address signal;

(b) causing said remote transmitter to send a selected one of said receiver address signals so that a single selected receiver is enabled thereby.

21. In a railroad hopper car equipped for operation on a pair of railroad rails, said car including at least two material containing hoppers with one of said hoppers positioned toward one end of said car and the other of said hoppers being positioned toward the opposite end of said car, each hopper including a hopper discharge control member for selectively dropping material in the hoppers between said rails or outside of said rails, the improvement comprising:

(a) a pair of V shaped material distributing blades attached beneath said railroad car, each said blade being of a width which simultaneously encompasses both rails of a railroad track, with each said blade being selectively movable between a lowered, operative position in which the blade is positioned to push material dropped from said car off of said rails and a raised, non-operative position, both of said blades being located between said hopper discharge control members toward a center of said car and with said blades being oriented with the center portions of their respective V's pointing away from each other; and (b) a pair of blade operating means for respectively, selectively moving said blades between said operative and said non-operative positions such that one of said blades can be properly positioned to distribute the material dropped from a first of said hopper discharge control members while material dropped from the other of said hopper discharge control members is sprinkle dumped on the material so distributed regardless of the direction of travel of said car.

22. A railroad hopper car as in claim 21, wherein each said blade further comprises:

(a) at least one wing portion which is extendable and retractable to thereby adjust the effective width of said blade; and (b) wing operating means for selectively extending and retracting said wing portion.

23. A railroad hopper car as in claim 21, wherein:

(a) each of said blade operating means comprises a hydraulic actuator means.

24. A railroad hopper car as in claim 23, wherein:

(a) each of said blades is pivotably attached beneath said railroad car, and each of said hydraulic actuator means is operative to pivot the respective blade between said raised, non-operative position and said lowered, operative position.

25. A railroad hopper car as in claim 24, wherein each of said blades further comprises:

(a) roller means for contacting and rolling along said rails when said blade is in said operative position to thereby otherwise hold said blade just clear of said rails.

26. A railroad hopper car as in claim 21, wherein each of said hopper discharge control members includes a hopper discharge control member operating means, the improvement further comprising:

(a) control means for remotely controlling said blades and said hopper discharge control members, said control means including:

(i) a receiver on said car connected to the respective hopper discharge control member operating means and blade operating means on the car, said receiver being responsive to coded control signals to selectively, independently and individually control positions of each of said hopper discharge control members and said blades; and (ii) a mobile remote transmitter selectively operable to transmit any one of said coded control signals to cause said receiver to control the connected hopper discharge control member operating means and blade operating means.

* * * * *